(No Model.)

M. J. HOEY.
AUTOMATIC DUST GUARD FOR TRAIN PIPE COUPLINGS.

No. 603,190.  Patented Apr. 26, 1898.

Witnesses.
Robert Everitt,
Philip N. Tilden

Inventor:
Michael J. Hoey,
By
Frederic B. Keefer
Atty.

UNITED STATES PATENT OFFICE.

MICHAEL J. HOEY, OF COLUMBUS, OHIO.

AUTOMATIC DUST-GUARD FOR TRAIN-PIPE COUPLINGS.

SPECIFICATION forming part of Letters Patent No. 603,190, dated April 26, 1898.

Application filed November 8, 1897. Serial No. 657,895. (No model.)

*To all whom it may concern:*

Be it known that I, MICHAEL J. HOEY, a citizen of the United States, residing at Columbus, Ohio, have invented certain new and useful Improvements in Automatic Dust-Guards for Train-Pipe Couplings, of which the following is a specification.

This invention relates to an automatic dust-guard for train-pipe couplings, and has for its object to provide an extremely simple, inexpensive, and efficient automatically-operating guard which will with certainty and rapidity close the half-couplings of train-pipes under all circumstances to effectually exclude the admission of dust, dirt, and cinders to the half-couplings or the rubber packings thereof.

To these ends my invention consists in the features and in the construction, combination, and arrangement of parts hereinafter described, and particularly set forth in the claims following the description, reference being had to the accompanying drawings, forming a part of this specification, wherein—

Figure 1:
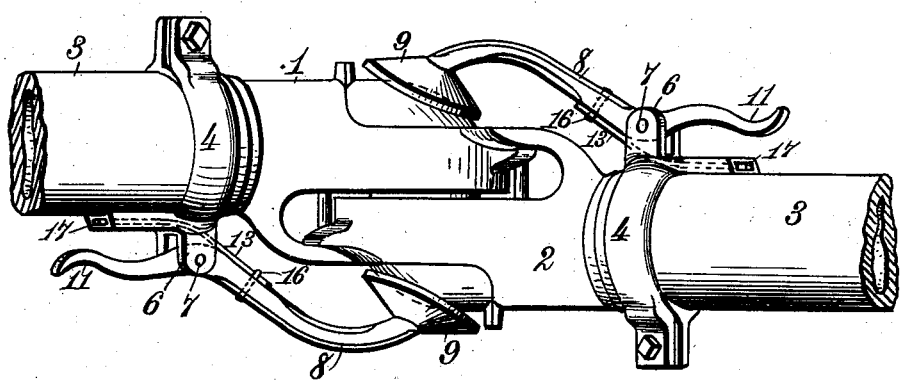
Figure 2:
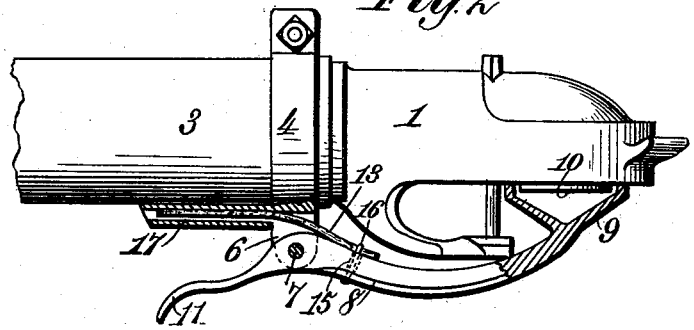
Figure 3:
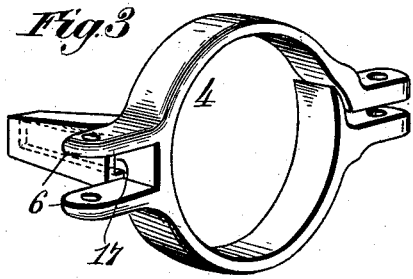
Figure 4:
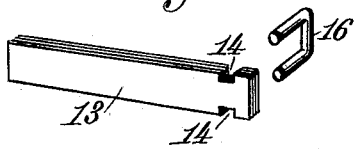

Figure 1 is a top plan view of a hose-pipe coupling, with my improved dust-guard attached thereto, the coupling being shown in a coupled position. Fig. 2 is a similar view of a half-coupling. Fig. 3 is a perspective view of the sleeve for connecting the hose-section to the coupling, and Fig. 4 is a detail view of the spring.

Referring to the drawings, the numerals 1 and 2 indicate the two half-couplings of a train pipe or hose which are adapted to be coupled together in a usual and well-known manner and to which are connected the sections 3 of the train pipe or hose in the manner hereinafter described. Over the shanks or ends of the half-couplings 1 and 2 are fitted the ends of the train pipe or hose sections 3, which are clamped thereon by split rings or collars 4. Each of the collars 4 comprises an annular band provided with two circumferentially-projecting lugs or ears 6, correspondingly apertured for the reception of a pivot-pin 7, which operates as the fulcrum for a lever 8. The lever 8 is provided at its forward end with a hood or cap 9, that is adapted to fit over the rubber gasket 10 of the adjacent half-coupling and projects rearwardly of the pivot 7 to form a handle 11, that falls naturally within the grasp of the hand of the operator when the two half-couplings are uncoupled. A spring is employed to normally hold the cap or hood 9 to its seat over the rubber gasket, said spring consisting of a plurality of resilient metallic leaves 13, superimposed one upon the other and provided at one end and upon opposite sides with notches or recesses 14. The lever 8 is provided at a point in advance of its pivot with two apertures 15, through which are passed the ends of a staple 16, that embraces and clasps to the lever the forward end of the spring 13. The rear end of said spring is free and is fitted and rests in a socket 17, that projects rearwardly from the collar 4. The free end of the spring is adapted to slide back and forth within this socket, and its bearing-surface is thus kept smooth and even and protected against the corrosive and deteriorating effects of the weather and the entrance of dust and grit. The lever, its bearing, and the spring are all carried by the collar 4, so that in the event of injury to any one of the parts it is only necessary to remove the collar and replace it by another one.

Having thus described my invention, what I claim as new, and desire to secure by Letters Patent, is—

1. In a train-pipe coupling, the combination with the half-coupling, of a collar provided with means for attachment to the pipe-section, a lever pivoted intermediate its ends to said collar and provided with a hood or cap arranged to cover the open end of said half-coupling, a housing provided on said collar, and a leaf-spring connected at one end to said lever and having its free end slidably supported within said housing, substantially as described.

2. In a train-pipe coupling, the combination with the half-coupling, of a collar provided with means for attachment to the pipe-section, a lever pivoted intermediate its ends to said collar and provided with a hood or cap arranged to fit over the open end of said half-coupling, and a spring comprising a plurality of resilient leaves rigidly attached at one end to said lever and having a movable bearing upon a support carried by the said collar, substantially as described.

In testimony whereof I have hereunto set my hand in presence of two subscribing witnesses.

MICHAEL J. HOEY.

Witnesses:
WILLIAM E. LOLLER,
HARRY T. WILSON.